(12) United States Patent
Liu et al.

(10) Patent No.: US 10,483,590 B2
(45) Date of Patent: Nov. 19, 2019

(54) ELECTROLYTE FOR LITHIUM ION BATTERY AND LITHIUM ION BATTERY INCLUDING THE SAME

(71) Applicant: OPTIMUM BATTERY CO., LTD., Shenzhen, Guangdong (CN)

(72) Inventors: Xilin Liu, Guangdong (CN); Mumin Rao, Guangdong (CN); Yao Li, Guangdong (CN)

(73) Assignee: OPTIMUM BATTERY CO., LTD., Shenzhen (CN)

( * ) Notice: Subject to any disclaimer, the term of this patent is extended or adjusted under 35 U.S.C. 154(b) by 112 days.

(21) Appl. No.: 15/876,229

(22) Filed: Jan. 22, 2018

(65) Prior Publication Data

US 2018/0212276 A1    Jul. 26, 2018

(30) Foreign Application Priority Data

Jan. 20, 2017 (CN) .......................... 2017 1 0041690

(51) Int. Cl.
| | | |
|---|---|---|
| H01M 10/0567 | (2010.01) | |
| H01M 10/0525 | (2010.01) | |
| H01M 10/0569 | (2010.01) | |
| H01M 10/0568 | (2010.01) | |
| H01M 10/0587 | (2010.01) | |

(52) U.S. Cl.
CPC ... *H01M 10/0567* (2013.01); *H01M 10/0525* (2013.01); *H01M 10/0568* (2013.01); *H01M 10/0569* (2013.01); *H01M 10/0587* (2013.01); *H01M 2300/0042* (2013.01)

(58) Field of Classification Search
CPC ......... H01M 10/0567; H01M 10/0587; H01M 10/0569; H01M 10/0525; H01M 10/0568; H01M 2300/0042
See application file for complete search history.

(56) References Cited

U.S. PATENT DOCUMENTS

| | | | |
|---|---|---|---|
| 9,312,073 B2* | 4/2016 | Kaneko | H01G 9/038 |
| 2009/0017386 A1* | 1/2009 | Xu | H01M 4/40 |
| | | | 429/331 |
| 2009/0142663 A1* | 6/2009 | Takeuchi | H01M 10/0567 |
| | | | 429/188 |
| 2016/0322669 A1* | 11/2016 | Sawa | H01M 10/0525 |
| 2017/0040608 A1* | 2/2017 | Asano | H01M 4/525 |

\* cited by examiner

*Primary Examiner* — Stewart A Fraser

(57) ABSTRACT

The present application provides an electrolyte for lithium ion battery which comprising a mixture of organic solvents consisting of ethylene carbonate, ethyl methyl carbonate, dimethyl carbonate and carboxylate ester, wherein a mass ratio of ethylene carbonate, ethyl methyl carbonate, dimethyl carbonate and carboxylate ester is (20%-30%):(45%-55%):(10%-20%):(5%-15%); a mixture of additives consisting of vinylene carbonate, propane sultone, fluorinated ethylene carbonate and perfluorohexylsulfonyl fluoride; and a lithium salt. The electrolyte for lithium ion battery provided according to the present application has good wettability and high absorption rate. The present application also provides a lithium ion battery with high energy density, small internal resistance, good cycle performance and good charge and discharge performance.

16 Claims, 2 Drawing Sheets

ELECTROLYTE FOR LITHIUM ION BATTERY AND LITHIUM ION BATTERY INCLUDING THE SAME

CROSS-REFERENCE TO RELATED APPLICATION

The present application claims priority to Chinese patent application number CN 201710041690.9 filed on Jan. 20, 2017, the whole disclosure of which is incorporated herein by reference.

BACKGROUND OF THE INVENTION

Field of the Invention

The present application generally relates to lithium ion batteries and, more particularly, to an electrolyte for lithium ion battery and a lithium ion battery including the same.

Description of the Related Art

With the shortage of fossil fuels and the worsening of environmental pollution problems, lots of countries in the world are making great efforts to develop sustainable and clean energy. After a long period of development, lithium ion batteries have been widely used in various fields of human life, especially in the field of electric vehicles. With the continuous development of science and technology, people have put forward higher and higher requirements for the mileage of electric vehicles, which requires that lithium ion batteries have higher energy density. In order to improve the energy density of lithium ion batteries without changing the existing positive and negative materials, higher capacity of lithium ion batteries may be obtained through increasing compaction density of positive electrode or negative electrode. However, the greater the compaction density of the electrode, the poorer wettability of electrolyte to the electrode. The insufficient infiltration of the electrolyte to the electrode causes the increasing of migration resistance of lithium ions in the electrode during charging and discharging process.

In view of the foregoing, what is needed, therefore, is to provide an electrolyte for lithium ion battery and a lithium ion battery including the same to overcome the defects as mentioned above.

SUMMARY OF THE INVENTION

One object of the present application is to provide an electrolyte for lithium ion battery, which could not only improve the wettability of electrolyte to electrode, but also enhance electrolyte absorption rate of lithium ion battery so as to improve production efficiency. Furthermore, a lithium ion battery including the electrolyte provided according to the present application has high energy density, small internal resistance, good cycle performance and good charge and discharge performance.

One embodiment of the present application provides an electrolyte, comprising a mixture of organic solvents consisting of ethylene carbonate, ethyl methyl carbonate, dimethyl carbonate and carboxylate ester, wherein a mass ratio of ethylene carbonate, ethyl methyl carbonate, dimethyl carbonate and carboxylate ester is (20%-30%):(45%-55%):(10%-20%):(5%-15%); a mixture of additives consisting of vinylene carbonate, propane sultone, fluorinated ethylene carbonate and perfluorohexylsulfonyl fluoride; and a lithium salt.

According to one aspect of the present application, the vinylene carbonate accounts for 1%-5% of the total mass of the mixture of organic solvents.

According to one aspect of the present application, the propane sultone accounts for 1%-5% of the total mass of the mixture of organic solvents.

According to one aspect of the present application, the fluorinated ethylene carbonate accounts for 1%-3% of the total mass of the mixture of organic solvents.

According to one aspect of the present application, the perfluorohexylsulfonyl fluoride accounts for 0.01%-0.2% of the total mass of the mixture of organic solvents.

According to one aspect of the present application, the lithium salt is selected from a group consisting of lithium hexafluorophosphate, lithium tetrafluoroborate, lithium bis oxalate borate, lithium difluoro oxalate borate, lithium trifluoromethanesulfonate, lithium perfluoroalkylsulphide, lithium bis (trifluoromethylsulfonyl), and combinations thereof.

According to one aspect of the present application, a concentration of the lithium salt is 1.0 mol/L-1.3 mol/L.

According to one aspect of the present application, the mass ratio of ethylene carbonate, ethyl methyl carbonate, dimethyl carbonate and carboxylate ester is 25%:50%:15%:10%.

Compared with the prior art, the electrolyte for lithium ion battery provided according to the present application has better wettability and higher absorption rate.

One embodiment of the present application provides a lithium ion battery, comprising a shell having an opening at one end, a winding core positioned in the shell, the electrolyte provided according to the present application received in the shell and immersing the winding core, and a cap cover positioned in the opening for enclosing the opening.

Compared with the prior art, the lithium ion battery provided according to the present application has higher energy density, smaller internal resistance, better cycle performance and better charge and discharge performance.

DETAILED DESCRIPTION OF THE PREFERRED EMBODIMENTS

In order that the objects, technical solution and technical effects of the present application can be understood more clearly, the present application will be described in more detail with reference to the accompanying drawings and examples. It should be understood that the specific examples described herein are illustrative only and are not intended to limit the present application.

One embodiment of the present application provides an electrolyte, comprising a mixture of organic solvents consisting of ethylene carbonate, ethyl methyl carbonate, dimethyl carbonate and carboxylate ester, wherein a mass ratio of ethylene carbonate, ethyl methyl carbonate, dimethyl carbonate and carboxylate ester is (20%-30%):(45%-55%):(10%-20%):(5%-15%); a mixture of additives consisting of vinylene carbonate, propane sultone, fluorinated ethylene carbonate and perfluorohexylsulfonyl fluoride; and a lithium salt.

Specifically, the vinylene carbonate accounts for 1%-5% of the total mass of the mixture of organic solvents; the propane sultone accounts for 1%-5% of the total mass of the mixture of organic solvents; the fluorinated ethylene carbonate accounts for 1%-3% of the total mass of the mixture of organic solvents; and the perfluorohexylsulfonyl fluoride accounts for 0.01%-0.2% of the total mass of the mixture of organic solvents.

Specifically, the lithium salt is selected from a group consisting of lithium hexafluorophosphate, lithium tetrafluoroborate, lithium bis oxalate borate, lithium difluoro oxalate borate, lithium trifluoromethanesulfonate, lithium perfluoroalkylsulphide, lithium bis (trifluoromethylsulfonyl), and combinations thereof.

Specifically, a concentration of the lithium salt is 1.0 mol/L-1.3 mol/L.

Figure 1:
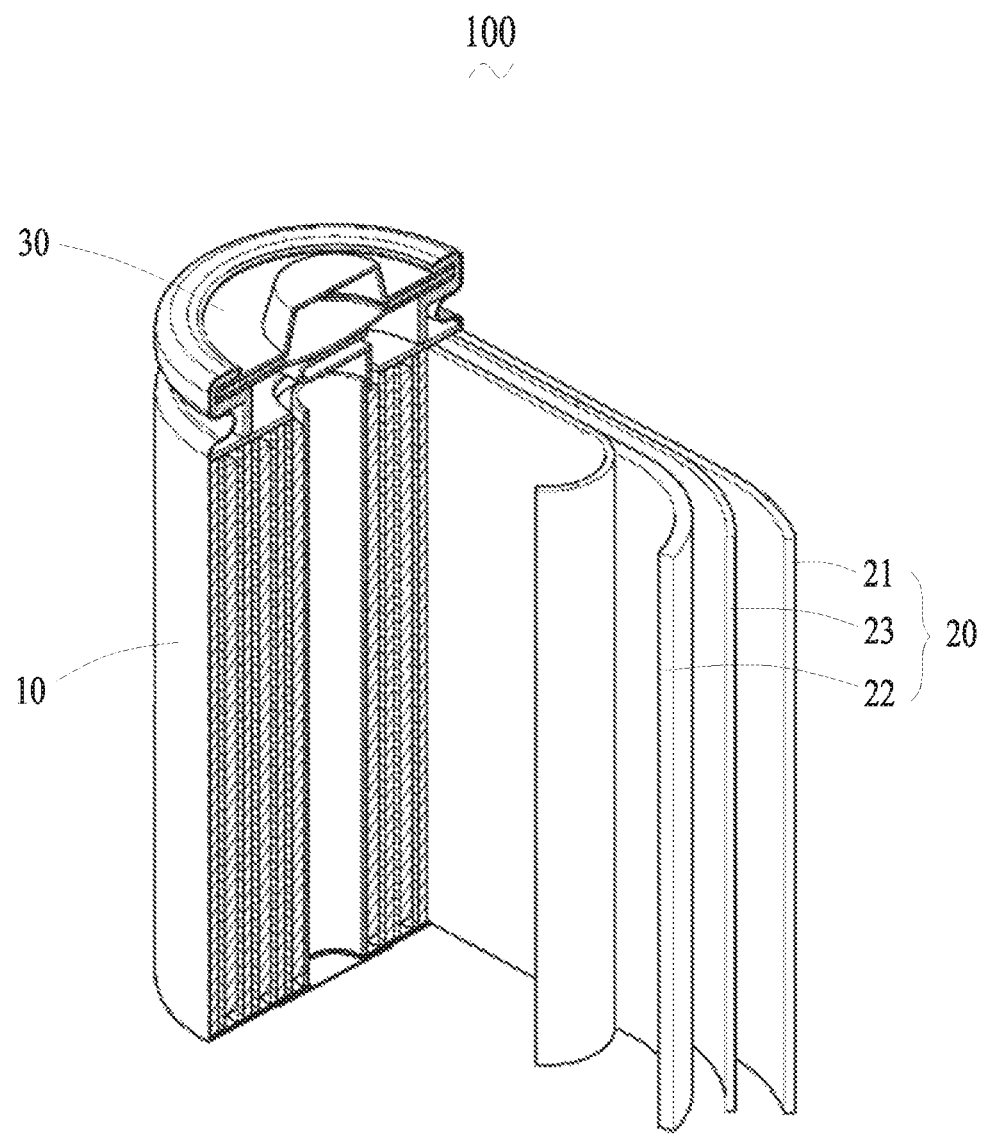
FIG. 1 depicts a schematic view of a lithium ion battery provided according to the present application.

Referring to FIG. 1, one embodiment of the present application provides a lithium ion battery 100, which comprising a shell 10 having an opening at one end, a winding core 20 positioned in the shell 10, an electrolyte received in the shell 10 and immersing the winding core 20, and a cap cover 30 positioned in the opening for enclosing the opening; wherein the electrolyte comprising a mixture of organic solvents consisting of ethylene carbonate, ethyl methyl carbonate, dimethyl carbonate and carboxylate ester; a mixture of additives consisting of vinylene carbonate, propane sultone, fluorinated ethylene carbonate and perfluorohexylsulfonyl fluoride; and a lithium salt.

Specifically, the winding core 20 comprising a positive electrode 21, a negative electrode 22 and a separator 23 positioned between the positive electrode 21 and the negative electrode 22.

Specifically, a mass ratio of ethylene carbonate, ethyl methyl carbonate, dimethyl carbonate and carboxylate ester is (20%-30%):(45%-55%):(10%-20%):(5%-15%).

Specifically, the vinylene carbonate accounts for 1%-5% of the total mass of the mixture of organic solvents; the propane sultone accounts for 1%-5% of the total mass of the mixture of organic solvents; the fluorinated ethylene carbonate accounts for 1%-3% of the total mass of the mixture of organic solvents; and the perfluorohexylsulfonyl fluoride accounts for 0.01%-0.2% of the total mass of the mixture of organic solvents.

Specifically, the lithium salt is selected from a group consisting of lithium hexafluorophosphate, lithium tetrafluoroborate, lithium bis oxalate borate, lithium difluoro oxalate borate, lithium trifluoromethanesulfonate, lithium perfluoroalkylsulphide, lithium bis (trifluoromethylsulfonyl), and combinations thereof.

Specifically, a concentration of the lithium salt is 1.0 mol/L-1.3 mol/L.

Example 1

1. mixing ethylene carbonate, ethyl methyl carbonate, dimethyl carbonate and carboxylate ester in a mass ratio of 25%:50%:15%:10% to obtain a mixture of organic solvents;

2. adding vinylene carbonate, propane sultone, fluorinated ethylene carbonate and perfluorohexylsulfonyl fluoride into the mixture of organic solvents to obtain a mixture of organic solvents and additives, wherein mass fractions of vinylene carbonate, propane sultone, fluorinated ethylene carbonate and perfluorohexylsulfonyl fluoride with respect to the mixture of organic solvents respectively are 1.5%, 2%, 1.5% and 0.05%;

3. adding lithium hexafluorophosphate into the mixture of organic solvents and additives to obtain an electrolyte, wherein a concentration of the lithium hexafluorophosphate is 1.2 mol/L;

4. mixing lithium iron phosphate, carbon black, carbon nanotube and polyvinylidene fluoride in a mass ratio of 95:1.5:1:2.5 to obtain a slurry, coating the slurry on two opposite surfaces of a aluminum foil to obtain a positive electrode 21;

5. mixing graphite, carbon black, sodium carboxymethyl cellulose and styrene butadiene rubber in a mass ratio of 95.2:1.5:1.3:2 to obtain another slurry, coating the another slurry on two opposite surfaces of a copper foil to obtain a negative electrode 22;

6. setting a separator 23 between the positive electrode 21 and the negative electrode 22 and rolling the positive electrode 21, the negative electrode 22 and the separator 23 into a winding core 20;

7. receiving the winding core 20 in a shell 10, injecting the electrolyte to immerse the winding core 20, and sealing the shell 10 to obtain a lithium ion battery 100.

Example 2

The lithium ion battery 100 of Example 2 is almost the same as that of Example 1, the difference lies in that the mass ratio of ethylene carbonate, ethyl methyl carbonate, dimethyl carbonate and carboxylate ester is 20%:45%:20%:15%.

Example 3

The lithium ion battery 100 of Example 3 is almost the same as that of Example 1, the difference lies in that the mass ratio of ethylene carbonate, ethyl methyl carbonate, dimethyl carbonate and carboxylate ester is 30%:55%:10%:5%.

Example 4

The lithium ion battery 100 of Example 4 is almost the same as that of Example 1, the difference lies in that the mass ratio of ethylene carbonate, ethyl methyl carbonate, dimethyl carbonate and carboxylate ester is 20%:55%:10%:15%.

Example 5

The lithium ion battery 100 of Example 5 is almost the same as that of Example 1, the difference lies in that the mass ratio of ethylene carbonate, ethyl methyl carbonate, dimethyl carbonate and carboxylate ester is 30%:45%:20%:5%.

Example 6

The lithium ion battery 100 of Example 6 is almost the same as that of Example 1, the difference lies in that mass fractions of vinylene carbonate, propane sultone, fluorinated ethylene carbonate and perfluorohexylsulfonyl fluoride with respect to the mixture of organic solvents respectively are 1%, 1%, 3% and 0.2%.

Example 7

The lithium ion battery 100 of Example 7 is almost the same as that of Example 1, the difference lies in that mass fractions of vinylene carbonate, propane sultone, fluorinated ethylene carbonate and perfluorohexylsulfonyl fluoride with respect to the mixture of organic solvents respectively are 5%, 1%, 1% and 0.01%.

Example 8

The lithium ion battery 100 of Example 8 is almost the same as that of Example 1, the difference lies in that mass fractions of vinylene carbonate, propane sultone, fluorinated ethylene carbonate and perfluorohexylsulfonyl fluoride with respect to the mixture of organic solvents respectively are 1%, 5%, 1% and 0.01%.

Comparative Example 1

1. mixing ethylene carbonate, ethyl methyl carbonate, dimethyl carbonate and carboxylate ester in a mass ratio of 34%:38%:20%:8% to obtain a mixture of organic solvents;
2. adding vinylene carbonate and propane sultone into the mixture of organic solvents to obtain a mixture of organic solvents and additives, wherein mass fractions of vinylene carbonate and propane sultone with respect to the mixture of organic solvents respectively are 2% and 2%;
3. adding lithium hexafluorophosphate into the mixture of organic solvents and additives to obtain an electrolyte, wherein a concentration of the lithium hexafluorophosphate is 1.2 mol/L;
4. mixing lithium iron phosphate, carbon black, carbon nanotube and polyvinylidene fluoride in a mass ratio of 95:1.5:1:2.5 to obtain a slurry, coating the slurry on two opposite surfaces of a aluminum foil to obtain a positive electrode 21;
5. mixing graphite, carbon black, sodium carboxymethyl cellulose and styrene butadiene rubber in a mass ratio of 95.2:1.5:1.3:2 to obtain another slurry, coating the another slurry on two opposite surfaces of a copper foil to obtain a negative electrode 22;
6. setting a separator 23 between the positive electrode 21 and the negative electrode 22 and rolling the positive electrode 21, the negative electrode 22 and the separator 23 into a winding core 20;
7. receiving the winding core 20 in a shell 10, injecting the electrolyte to immerse the winding core 20, and sealing the shell 10 to obtain a lithium ion battery 100.

As for lithium ion batteries prepared according to Example 1 and Comparative example 1, the total mass before and after injecting electrolyte were recorded as M1 and M2 respectively. Absorption rate (V) of electrolyte could be obtained by the following formula: V=(M1−M2)/t, wherein, t represents immersing time of the electrolyte to the winding core under vacuum conditions. Absorption rates of electrolyte of lithium ion batteries prepared according to Example 1 and Comparative example 1 are shown in Tab. 1.

TABLE 1 absorption rates of electrolyte of lithium ion batteries prepared according to Example 1 and Comparative example 1

|  | M1 (g) | M2 (g) | M (g) | V (g/min) |
|---|---|---|---|---|
| Example 1 | 112.8 | 133.1 | 20.3 | 0.41 |
| Comparative example 1 | 112.7 | 128.4 | 15.7 | 0.31 |

Internal resistance, first coulombic efficiency, capacity and energy density of lithium ion batteries prepared according to Example 1 and Comparative example 1 are shown in Tab. 2.

TABLE 2 internal resistance, first coulombic efficiency, capacity and energy density of lithium ion batteries prepared according to Example 1 and Comparative example 1

|  | Internal | First Coulombic | Capacity | Energy Density |
|---|---|---|---|---|
| Example 1 | 6.0 | 89.12 | 6132 | 140.4 |
| Comparative example 1 | 7.2 | 85.64 | 5862 | 138.3 |

Constant charge current ratio and median discharge voltage at 1C, constant charge current ratio and median discharge voltage at 3C, and constant charge current ratio and median discharge voltage at 5C of lithium ion batteries prepared according to Example 1 and Comparative example 1 are shown in Tab. 3.

TABLE 3 constant charge current ratio and median discharge voltage of lithium ion batteries prepared according to Example 1 and Comparative example 1

|  | Constant charge current ratio (%) | | | Median discharge voltage (V) | | |
|---|---|---|---|---|---|---|
|  | 1 C | 3 C | 5 C | 1 C | 3 C | 5 C |
| Example 1 | 97.62 | 94.55 | 85.43 | 3.21 | 3.10 | 3.02 |
| Comparative example 1 | 94.96 | 84.79 | 65.87 | 3.16 | 3.04 | 2.95 |

Referring to Tab. 1, Tab. 2 and Tab. 3, compared with the lithium ion battery prepared according to Comparative example 1, the lithium ion battery prepared according to Example 1 has faster absorption rate, smaller internal resistance, higher first coulombic efficiency, higher capacity, higher energy density, and larger constant charge ratio and median discharge voltage.

Figure 2:
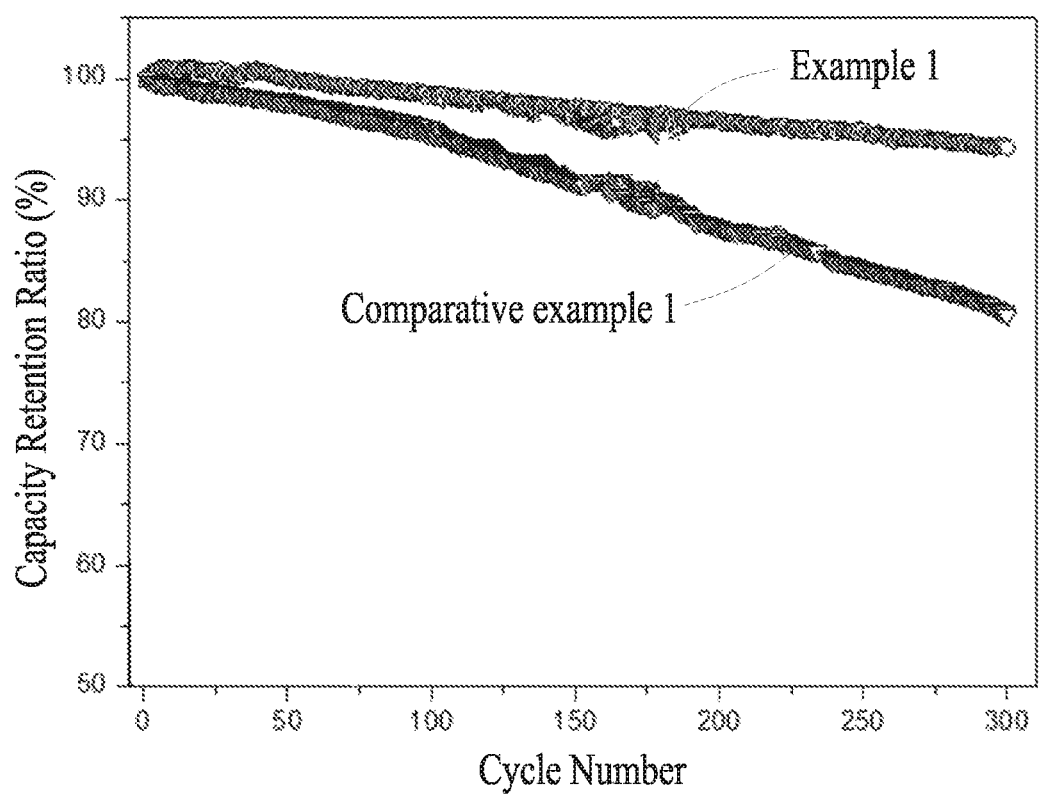
FIG. 2 depicts 3C cycle diagrams of lithium ion batteries prepared according to Example 1 and Comparative example 1 of the present application.

FIG. 2 shows 3C cycle diagrams of lithium ion batteries prepared according to Example 1 and Comparative example 2 of the present application. The cycle performance was tested under room temperature with a voltage range of 2.0-3.65V. It could be observed that the lithium ion battery prepared according to Example 1 has better capacity retention ratio than the lithium ion battery prepared according to Comparative example 1.

It should be understood that the above examples are only used to illustrate the technical concept and feature of the present application, and the purpose to thereof is familiarize the person skilled in the art to understand the content of the present application and carry it out, which cannot restrict the protection scope of the present invention based on above. Any equivalent transformation or modification made in the spirit of the present invention should all be included within the protection scope of the present application.

What is claimed is:
1. An electrolyte for lithium ion battery, comprising:
a mixture of organic solvents consisting of ethylene carbonate, ethyl methyl carbonate, dimethyl carbonate and carboxylate ester, wherein a mass ratio of ethylene carbonate, ethyl methyl carbonate, dimethyl carbonate and carboxylate ester is (20%-30%):(45%-55%):(10%-20%):(5%-15%);
a mixture of additives consisting of vinylene carbonate, propane sultone, fluorinated ethylene carbonate and perfluorohexylsulfonyl fluoride; and
a lithium salt.

2. The electrolyte for lithium ion battery according to claim 1, wherein the vinylene carbonate accounts for 1%-5% of the total mass of the mixture of organic solvents.

3. The electrolyte for lithium ion battery according to claim 1, wherein the propane sultone accounts for 1%-5% of the total mass of the mixture of organic solvents.

4. The electrolyte for lithium ion battery according to claim 1, wherein the fluorinated ethylene carbonate accounts for 1%-3% of the total mass of the mixture of organic solvents.

5. The electrolyte for lithium ion battery according to claim 1, wherein the perfluorohexylsulfonyl fluoride accounts for 0.01%-0.2% of the total mass of the mixture of organic solvents.

6. The electrolyte for lithium ion battery according to claim 1, wherein the lithium salt is selected from a group consisting of lithium hexafluorophosphate, lithium tetrafluoroborate, lithium bis oxalate borate, lithium difluoro oxalate borate, lithium trifluoromethanesulfonate, lithium perfluoroalkylsulphide, lithium bis (trifluoromethylsulfonyl), and combinations thereof.

7. The electrolyte for lithium ion battery according to claim 6, wherein a concentration of the lithium salt is 1.0 mol/L-1.3 mol/L.

8. The electrolyte for lithium ion battery according to claim 1, wherein the mass ratio of ethylene carbonate, ethyl methyl carbonate, dimethyl carbonate and carboxylate ester is 25%:50%:15%:10%.

9. A lithium ion battery (100), comprising a shell (10) having an opening at one end, a winding core (20) positioned in the shell (10), an electrolyte received in the shell (10) and immersing the winding core (20), and a cap cover (30) positioned in the opening for enclosing the opening; wherein the electrolyte comprising:
 a mixture of organic solvents consisting of ethylene carbonate, ethyl methyl carbonate, dimethyl carbonate and carboxylate ester, wherein a mass ratio of ethylene carbonate, ethyl methyl carbonate, dimethyl carbonate and carboxylate ester is (20%-30%):(45%-55%):(10%-20%):(5%-15%);
 a mixture of additives consisting of vinylene carbonate, propane sultone, fluorinated ethylene carbonate and perfluorohexylsulfonyl fluoride; and
 a lithium salt.

10. The lithium ion battery (100) according to claim 9, wherein the vinylene carbonate accounts for 1%-5% of the total mass of the mixture of organic solvents.

11. The lithium ion battery (100) according to claim 9, wherein the propane sultone accounts for 1%-5% of the total mass of the mixture of organic solvents.

12. The lithium ion battery (100) according to claim 9, wherein the fluorinated ethylene carbonate accounts for 1%-3% of the total mass of the mixture of organic solvents.

13. The lithium ion battery (100) according to claim 9, wherein the perfluorohexylsulfonyl fluoride accounts for 0.01%-0.2% of the total mass of the mixture of organic solvents.

14. The lithium ion battery (100) according to claim 9, wherein the lithium salt is selected from a group consisting of lithium hexafluorophosphate, lithium tetrafluoroborate, lithium bis oxalate borate, lithium difluoro oxalate borate, lithium trifluoromethanesulfonate, lithium perfluoroalkylsulphide, lithium bis (trifluoromethylsulfonyl), and combinations thereof.

15. The lithium ion battery (100) according to claim 14, wherein a concentration of the lithium salt is 1.0 mol/L-1.3 mol/L.

16. The lithium ion battery (100) according to claim 9, wherein the mass ratio of ethylene carbonate, ethyl methyl carbonate, dimethyl carbonate and carboxylate ester is 25%:50%:15%:10%.

* * * * *